US012002011B2

(12) United States Patent
Montero Orozco et al.

(10) Patent No.: US 12,002,011 B2
(45) Date of Patent: Jun. 4, 2024

(54) CONTENT CREATION USING A SMART ASSET LIBRARY

(71) Applicant: Lemon Inc., Grand Cayman (KY)

(72) Inventors: Cesar Alejandro Montero Orozco, Culver City, CA (US); Clement Boissiere, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/572,554

(22) Filed: Jan. 10, 2022

(65) Prior Publication Data

US 2023/0222445 A1    Jul. 13, 2023

(51) Int. Cl.
  *G06Q 10/101*   (2023.01)
  *G06Q 50/00*    (2012.01)

(52) U.S. Cl.
  CPC .......... *G06Q 10/101* (2013.01); *G06Q 50/01* (2013.01)

(58) Field of Classification Search
  CPC ............................. G06Q 10/101; G06Q 50/01
  See application file for complete search history.

(56) References Cited

U.S. PATENT DOCUMENTS

| | | | | |
|---|---|---|---|---|
| 10,803,669 | B1* | 10/2020 | Roche | G06F 3/04815 |
| 11,520,949 | B2* | 12/2022 | Reynolds | G06F 30/27 |
| 2006/0048092 | A1* | 3/2006 | Kirkley | A63F 13/63 |
| | | | | 717/100 |
| 2007/0050234 | A1* | 3/2007 | Corlett | G06F 30/13 |
| | | | | 705/7.29 |
| 2013/0036171 | A1* | 2/2013 | Gilbert | G06Q 50/01 |
| | | | | 709/204 |
| 2013/0073420 | A1* | 3/2013 | Kumm | G06Q 30/0601 |
| | | | | 705/26.8 |
| 2013/0132039 | A1* | 5/2013 | Flammenspeck | G06F 30/13 |
| | | | | 703/1 |
| 2013/0144566 | A1* | 6/2013 | De Biswas | G06F 30/00 |
| | | | | 703/1 |
| 2014/0236772 | A1* | 8/2014 | McCoy | G06Q 20/06 |
| | | | | 705/26.81 |

(Continued)

FOREIGN PATENT DOCUMENTS

CN    107993103 A    5/2018

OTHER PUBLICATIONS

International Patent Application No. PCT/SG2023/050013; Int'l Search Report; dated Jul. 3, 2023; 3 pages.

(Continued)

*Primary Examiner* — Florian M Zeender
*Assistant Examiner* — Karma A El-Chanti
(74) *Attorney, Agent, or Firm* — BakerHostetler

(57) ABSTRACT

The present disclosure describes techniques for facilitating content creation using a smart asset library. Information about a first user among a plurality of users in an online community may be received. The information about the first user may be indicative of the first user's preferences and behaviors in the online community. At least one asset in a library that the first user would find of interest may be determined based on the information about the first user and information about the library. The at least one asset may be presented to the first user. In response to receiving user input from the first user, at least one other asset related to the at least one asset may be determined and presented.

20 Claims, 10 Drawing Sheets

(56) References Cited

U.S. PATENT DOCUMENTS

| | | | |
|---|---|---|---|
| 2015/0213407 A1* | 7/2015 | Cabler | G06F 30/20 |
| | | | 705/300 |
| 2016/0019815 A1* | 1/2016 | Hagerty | G09B 19/0053 |
| | | | 434/118 |
| 2016/0367893 A1* | 12/2016 | Shipkov | G06T 19/006 |
| 2017/0006343 A1* | 1/2017 | Miller | H04N 21/4524 |
| 2018/0285818 A1* | 10/2018 | Soltani | G06Q 50/01 |
| 2019/0139322 A1* | 5/2019 | Besecker | G06Q 10/087 |
| 2020/0167318 A1* | 5/2020 | Saunders | G06F 21/6245 |
| 2020/0306639 A1* | 10/2020 | Karlsson | G06F 9/451 |
| 2021/0027643 A1* | 1/2021 | Schume | G06N 5/022 |
| 2021/0117071 A1 | 4/2021 | Gharpuray | |
| 2021/0166482 A1* | 6/2021 | Martinez Ruvalcaba | |
| | | | G06V 20/20 |
| 2021/0312393 A1* | 10/2021 | Stump | G06Q 10/101 |
| 2022/0292543 A1* | 9/2022 | Henderson | G06Q 30/0252 |
| 2022/0327608 A1* | 10/2022 | Assouline | G06T 19/006 |
| 2023/0214900 A1* | 7/2023 | Assouline | G06Q 50/01 |
| | | | 705/26.7 |

OTHER PUBLICATIONS

Geng et al.; "A systematic design method of adaptive augmented reality work instruction for complex industrial operations"; Computers in Industry; vol. 119; Aug. 2020; 7 pages (Abstract Only).

* cited by examiner

500

Receive information about a first user among a plurality of users in an online community, the information about the first user indicative of the first user's preferences and behaviors in the online community 502

Recommend the first user to import content into a library, wherein the content was created by the first user and published in the online community, wherein the library comprises a plurality of assets associated with creation of three-dimensional (3D) augmented reality content 504

Generate a sample project based on the information about the first user, wherein the sample project comprises at least one element included in the content 506

Present the sample project to the first user 508

Determine one or more assets related to the sample project based on information about the sample project 510

Recommend the one or more assets to the first user for use in the sample project 512

FIG. 5

```
                                         ┌─────────────────────────────────────────┐
900                                      │ Receive information about a first user  │
                                         │ among a plurality of users in an online │
                                         │ community, the information about the    │
                                         │ first user indicative of the first      │
                                         │ user's preferences and behaviors in the │
                                         │ online community 902                    │
                                         └─────────────────────────────────────────┘
```

Receive information about a first user among a plurality of users in an online community, the information about the first user indicative of the first user's preferences and behaviors in the online community 902

Recommend any particular users among the plurality of users to each other based on determining at least one similar attribute or at least one association between the any particular users, wherein the at least one similar attribute or the at least one association is determined based on information about the any particular users 904

Determine at least one asset in a library that the first user would find of interest based on the information about the first user and information about the library, wherein the library comprises a plurality of assets associated with creation of three-dimensional (3D) augmented reality content, and the information about the library comprises information associated with each of the plurality of assets 906

Present the at least one asset to the first user 908

Recommend one or more assets based on a search query input by the first user 910

FIG. 9

CONTENT CREATION USING A SMART ASSET LIBRARY

BACKGROUND

Communication is increasingly being conducted using Internet-based tools. The Internet-based tools may be any software or platform. Users may create content to be shared via such Internet-based tools. Improved techniques for content creation via such Internet-based tools are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows another example method for creating effects using a smart asset library, in accordance with the present disclosure.

FIG. 9 shows another example method for creating effects using a smart asset library, in accordance with the present disclosure.

DETAILED DESCRIPTION OF ILLUSTRATIVE EMBODIMENTS

Communication can be conducted using Internet-based tools that allow users to create content and distribute such content to other users for consumption. Such Internet-based tools may provide users with various two-dimensional (2D) or three-dimensional (3D) effects to use when creating content. The effects may include one or more augmented reality (AR) effects. An AR effect is a computer-generated effect layered over a real-life image that a camera of a user's device displays. To create these effects, one or more existing design tools may be utilized. These existing design tools often incorporate an asset library (e.g., an asset store). The asset library may store a variety of different assets. These assets may be utilized to create an effect. For example, the assets may include 3D models, 2D textures, materials, music, sound, etc. Some of these assets may belong to the same entity that owns the content creation tool, while others of these assets may belong to a third-party.

Figure 1:
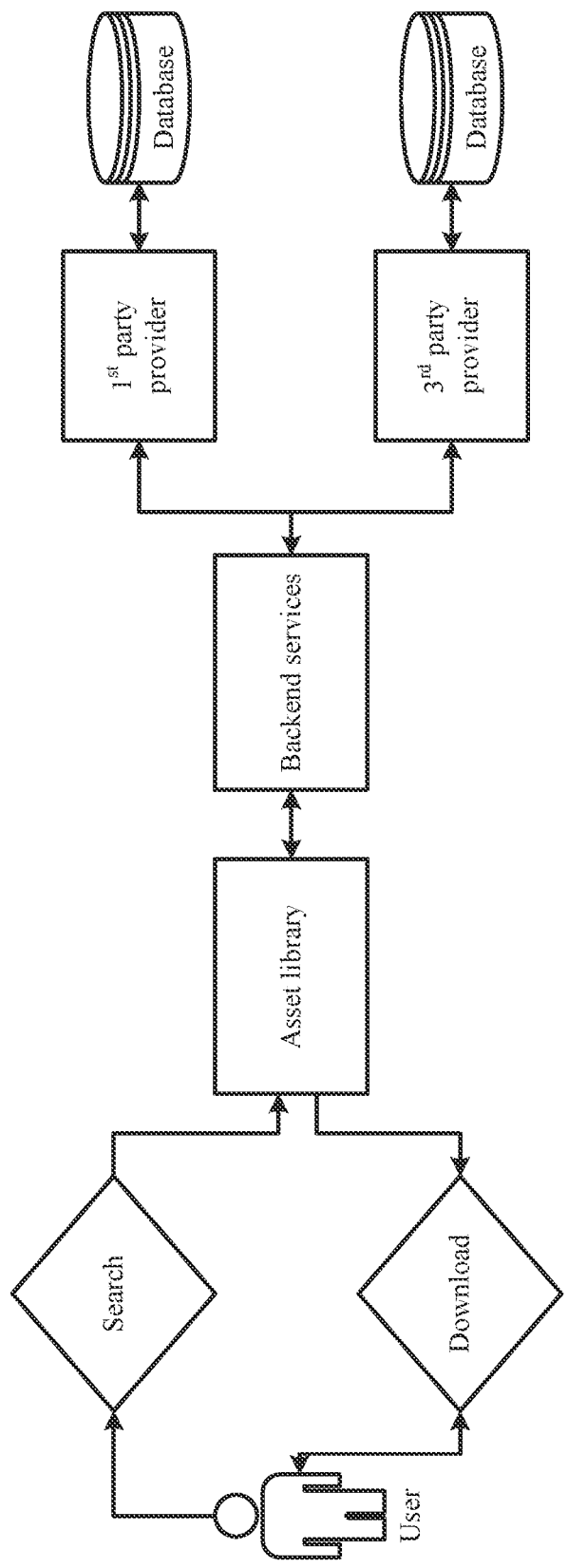
FIG. 1 shows an example flow chart depicting a prior art technique for creating effects using an asset library.

A user of the design tool can search for assets that are stored in the asset library. For example, FIG. 1 shows a flowchart 100 of a user searching for assets that are stored in the asset library associated with an existing design tool. The user can search for an asset in the asset library. For example, the user can search for "toys." In response to the search, the asset library returns assets that are associated with the search, such as the keyword search "toys." For example, the asset library may return assets including a 3D model for a panda bear. The returned assets may be from a first or third-party provider (e.g., sketchfab). The user can download any of the returned assets that the user wants to use to create an effect. For example, the user can download the 3D panda bear model. The user can then use the design tool to build the effect with the 3D panda bear model.

However, while the above-described approach is functional, it has several drawbacks. First, the above-described approach often requires users to do manual text searches on different platforms (e.g., Google, TurboSquid, EpicMarketplace). Such platforms do not know the user's level of knowledge of the user, what projects the user is working on, other users that the user would be likely to collaborate with, etc. As a result, the user needs to perform a large quantity of manual search queries to find adequate resources for the project. Second, once the user finds an asset of interest, the user needs to download it to the user's device. Then, the user must manually import the assets manually into the design tool. In some instances, after the user has already imported the asset into the design tool, the user may realize that the asset was not imported in a format that is compatible with the design tool. The user then needs to go back to the external asset libraries to find the correct asset.

Third, when the user utilizes external asset libraries to find assets, the results will be purely driven by user input, such as a combination of search terms and filters, without any additional guidance from the design tool. Additional, related content that may be helpful to the user will not be recommended to the user. Fourth, such search engines do not have any knowledge of user interests. As a result, such search engines cannot suggest projects, tutorials, or other creators that might inspire a user based on what the user has already done. Users instead need to wait for inspiration to arrive or have to randomly search online for things that might captivate them. Fifth, if a user wants to learn about other creators for collaboration or networking purposes, the user has to go on online forums or social media to do so. Additionally, the most-viewed creators are often just the ones that have the most followers, but that does not mean that the user will be able to find a creator that has the same creation interests. The user is provided with a small set of creators, but not necessarily the ones that have the greatest similarities to the user.

Accordingly, improvements in content creation (e.g., effect design) tools are desired. An improved content creation tool is described herein. The improved tool facilitates content creation using a smart asset library. Instead of utilizing external asset libraries, the improved tool described herein performs asset recommendation within the tool. A recommendation engine can utilize user data and/or metadata to learn user behavior and interests. The commendation engine can suggest relevant assets for the user. If a user selects a specific asset, the recommendation engine adapts to understand that the selected asset is an item of interest. The recommendation engine can also recommend learning material to users. The recommendation engine can utilize data indicative of user's interactions within the design tool to deduct what level of expertise the user has regarding effect design. The recommendation engine can also recommend creators of interest to a user. For example, the recommendation engine can recommend creators based on user interest and behavior.

The improved design tool described herein utilizes a smart asset library. Such an improved design tool facilitates more efficient resource discovery, as the smart asset library allows users to perform fewer searches (or no searches at all) to find the resources needed for projects. The improved design tool described herein also facilitates more efficient user discovery, as the smart asset library allows users to connect with a greater quantity of like-minded people that create projects similar to them. The improved design tool described herein also facilitates accelerated learning, as the smart asset library allows users to accelerate their learning of effect design and produce faster and better results compared to competitors. The improved design tool described herein also increase user engagement, as users will spend more time within the design tool. This will result in more created effects.

Figure 2:
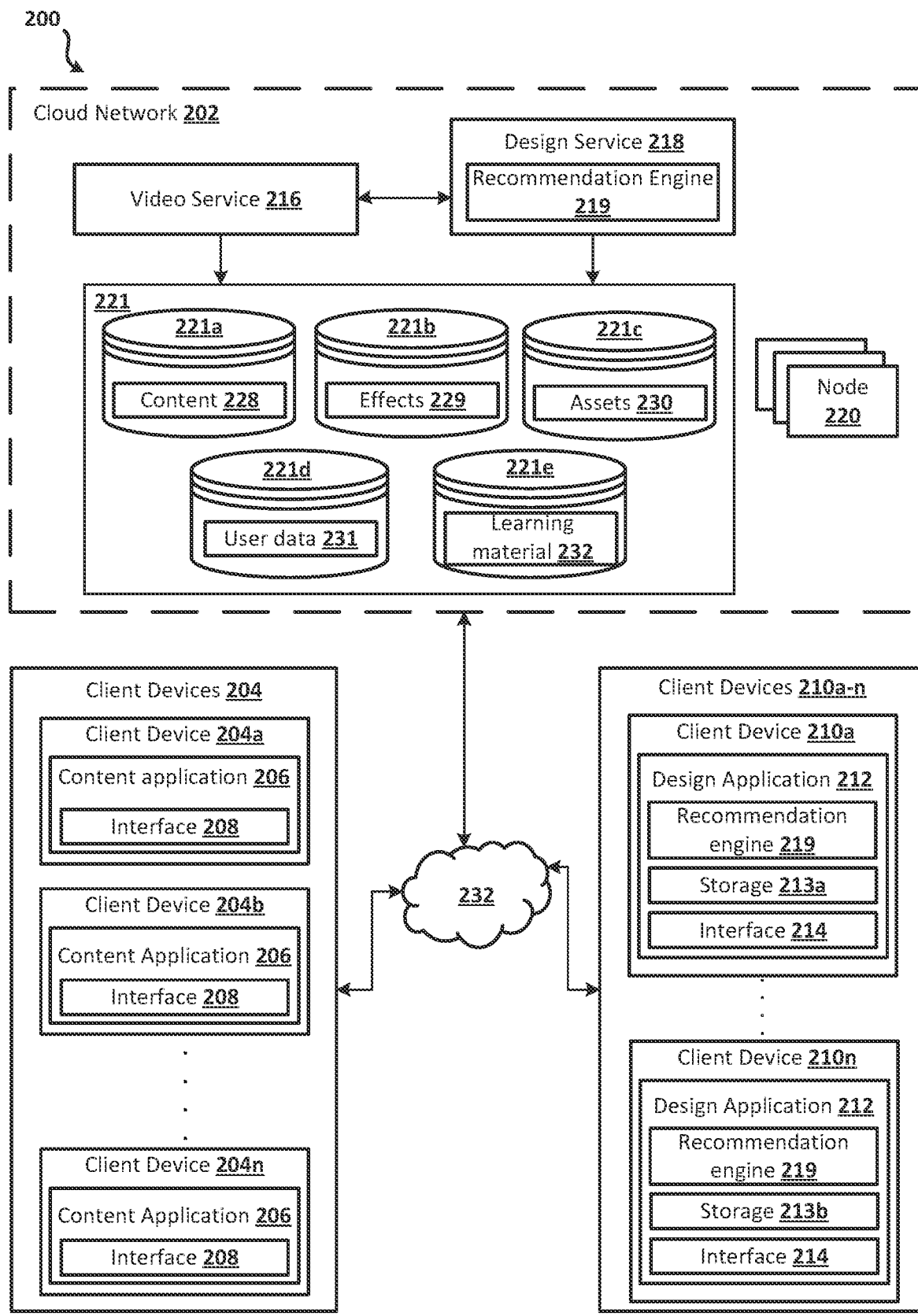
FIG. 2 shows an example system for creating effects using a smart asset library.

FIG. 2 illustrates an example system 200 for creating effects with a design tool that utilizes a smart asset library. The system 200 may comprise a cloud network 202 and a plurality of client devices 204a-n. The cloud network 202 and the plurality of client devices 204a-n may communicate with each other via one or more networks 232.

The cloud network 202 may be located at a data center, such as a single premise, or be distributed throughout different geographic locations (e.g., at several premises). The cloud network 202 may provide the services via the one or more networks 232. The network 232 comprise a variety of network devices, such as routers, switches, multiplexers, hubs, modems, bridges, repeaters, firewalls, proxy devices, and/or the like. The network 232 may comprise physical links, such as coaxial cable links, twisted pair cable links, fiber optic links, a combination thereof, and/or the like. The network 232 may comprise wireless links, such as cellular links, satellite links, Wi-Fi links and/or the like.

The cloud network 202 may comprise a plurality of computing nodes 220 that host a variety of services. In an embodiment, the nodes 220 host a video service 216. The video service 216 may comprise a content streaming service, such as an Internet protocol video streaming service. The video service 216 may be configured to distribute content 228 via a variety of transmission techniques. The video service 216 is configured to provide the content 228, such as video, audio, textual data, a combination thereof, and/or the like. The content 228 may comprise content streams (e.g., video stream, audio stream, information stream), content files (e.g., video file, audio file, text file), and/or other data. The content 228 may be stored in a database 221a selected from a plurality of databases 221a-e. For example, the video service 216 may comprise a video sharing service, a video hosting platform, a content distribution platform, a collaborative gaming platform, and/or the like.

In an embodiment, the content 228 distributed or provided by the video service 216 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, pulling pranks, or giving advice, such as beauty and fashion advice, cooking tips, or home renovation tips.

In an embodiment, the content 228 may be output to different client devices 204a-n via the network 232. The content 228 may be streamed to the client devices 204a-n. The content stream may be a stream of short videos received from the video service 216. The plurality of client devices 204a-n may be configured to access the content 228 from the video service 216. In an embodiment, a client device 204a-n may comprise a content application 206. The content application 206 outputs (e.g., display, render, present) the content 228 to a user associated with the client device 204a-n. The content may comprise videos, audio, comments, textual data and/or the like.

The plurality of client devices 204a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 204a-n may be associated with one or more users. A single user may use one or more of the plurality of client devices 204a-n to access the cloud network 202. The plurality of client devices 204a-n may travel to a variety of locations and use different networks to access the cloud network 202.

The video service 216 may be configured to receive input from users. The users may be registered as users of the video service 216 and may be users of the content application 206 operating on client devices 204a-n. The user inputs may include short videos created by users, user comments associated with short videos, or "likes" associated with short videos. The user inputs may include connection requests and user input data, such as text data, digital image data, or user content. The connection requests may comprise requests from the client devices 204a-n to connect to the video service 216. The user input data may include information, such as short videos and/or user comments, that the users connected to the video service 216 want to share with other connected users of the video service 216.

The video service 216 may be able to receive different types of input from users using different types of client devices 204a-n. For example, a user using the content application 206 on a first user device, such as a mobile phone or tablet, may be able to create and upload short videos using the content application 206. A user using the content application 206 on a different mobile phone or tablet may also be able to view, comment on, or "like" short videos or comments written by other users. In another example, a user using the content application 206 on a smart television, laptop, desktop, or gaming device may not be able to create and upload short videos or comment on short videos using the content application 206. Instead, the user using the content application 206 on a smart television, laptop, desktop, or gaming device may only be able to use the content application 206 to view short videos, view comments left by other users, and "like" short videos.

In an embodiment, a user may use the content application 206 on a client device 204a-n to create a short video and upload the short video to the cloud network 202. The client devices 204a-n may access an interface 208 of the content application 206. The interface 208 may comprise an input element. For example, the input element may be configured to allow users to create the short video. To create the short video, the user may give the content application 206 permission to access an image capture device, such as a camera, or a microphone of the client device 204a-n. Using the content application 206, the user may select a duration for the short video or set a speed for the short video, such as "slow-motion" or "speed things up."

In an embodiment, a user can use the content application 206 on a client device 204a-n to create a short video using an effect. The effect may be selected from a plurality of effects 229 stored in a database 221b. The effects may comprise two-dimensional (2D) and/or three-dimensional (3D) effects. For example, the effects may comprise one or more augmented reality (AR) effects. An AR effect is a computer-generated effect layered over a real-life image that a camera of a client device 204a-n displays. For example, an AR filter alters the image that a front or back camera of a client device 204a-n displays.

The user may create and/or edit the short video using the content application 206. The user may add one or more texts, filters, sounds to the short video. To add a pre-recorded audio overlay to the short video, the user may select a song or sound clip from a sound library of the content application 206. The sound library may include different songs, sound effects, or audio clips from movies, albums, and television shows. In addition to or in lieu of adding a pre-recorded audio overlay to the short video, the user may use the content application 206 to add a voice-over to the short video. The voice-over may be a sound recorded by the user using a microphone of the client device 204a-n. The user can add a text overlay to the short video and may use the content application 206 to specify when they want the text overlay to appear in the short video. The user may assign a caption, location tag, and one or more hashtags to the short video to indicate the subject matter of the short video. The content application 206 may prompt the user to select a frame of the short video to use as a "cover image" for the short video.

After the user has created the short video, the user may use the content application 206 to upload the short video to the cloud network 202 and/or to save the short video locally to the user device 204a-n. When a user uploads the short video to the cloud network 202, they may choose whether they want the short video to be viewable by all other users of the content application 206 or viewable by only a subset of the users of the content application 206. The video service 216 may store the uploaded short videos and any metadata associated with the short videos as content 228 in one or more databases 221a.

In an embodiment, a user may use the content application 206 on a client device 204a-n to provide input on a short video. The client devices 204a-n may access an interface 208 of the content application 206 that allows users to provide input associated with short videos. The interface 208 may comprise an input element. For example, the input element may be configured to receive input from a user, such as comments or "likes" associated with a particular short video. If the input is a comment, the content application 206 may allow a user to set an emoji associated with his or her input. The content application 206 may determine timing information for the input, such as when a user wrote a comment. The content application 206 may send the input and associated metadata to the cloud network 202. For example, the content application 206 may send a comment, an identifier of the user that wrote the comment, and the timing information for the comment to the cloud network 202. The video service 216 may store the input and associated metadata in a database 221a.

The video service 216 may be configured to output the uploaded short videos and user input to other users. The users may be registered as users of the video service 216 to view short videos created by other users. The users may be users of the content application 206 operating on client devices 204a-n. The content application 206 may output (display, render, present) the short videos and user comments to a user associated with a client device 204a-n. The client devices 204a-n may access an interface 208 of the content application 206. The interface 208 may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The video service 216 may output the short video and the associated comments simultaneously. Comments may be output by the video service 216 in real-time or near-real-time. The content application 206 may display the short videos and comments in various ways on the client device 204a-n. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

In an embodiment, the nodes 220 host a design service 218. The design service 218 may be configured to facilitate the creation of new effects. The new effects created via the design service 218 may comprise 2D and/or 3D effects. For example, the new effects may comprise one or more AR effects. The design service 218 may be configured to receive input from users that are utilizing the design service 218 to create effects. The users may be registered as users of the design service 218 and may be users of the design application 212 operating on client devices 210a-n. For example, the users may utilize the design application 212 to design effects via the design service 218. In embodiments, the users of the design service 218 are also users of the video service 216 and are users of the content application 106. For example, one or more of the client devices 210a-n may be the same as one or more of the client devices 204a-n, so that a single client device includes both the design application 212 and the content application 106. In an embodiment, after an effect is created via the design service 218, that effect can be stored in the database 221b so that users of client devices 204a-n can create content with the effect.

The plurality of client devices 210a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 210a-n may be associated with one or more users. A single user may use one or more of the plurality of client devices 210a-n to access the cloud network 202. The plurality of client devices 210a-n may travel to a variety of locations and use different networks to access the cloud network 202.

The design service 218 may utilize a smart asset library (e.g., database 221c) that is in communication with a recommendation engine 219. The recommendation engine 219 may be a component of the design service 218 and/or may be stored locally on client devices 210a-n within the design application 212. The smart asset library (e.g., database 221c) may store a variety of different assets that may be utilized by users of the design service 218 to create effects. For example, the assets stored in the smart asset library may include plug ins and scripts. Such scripts can be executed within the design service 218 to produce a desired behavior that manipulates the interface to produce something within. For example, a script can be run to change the name of all the imported assets to conform to a specific naming convention. The script can also produce visual results, such as user interfaces that help a user of the design service 218 be more efficient. By storing plug ins and scripts in the smart asset library, users of the design service 218 do not need to go to external sources to find relevant and compatible plug ins and scripts. Instead, users of the design service 218 can easily download and integrate the plugs ins and scripts into their workflows with less friction.

As another example, the assets stored in the smart asset library may include design projects and/or project files. A project can include all resource files associated with the project. In some embodiments, a project can include explanatory videos. A project can include plugins and scripts. As yet another example, the smart asset library may store project files. A project file can produce an "effect" on its own. Anything that can be imported into the design service 218 may be considered a project file. For example, project files can include 3D models. 3D models may be stored in any format that can contain a file representing points in 3D space. Such formats include, but are not limited to, STL, OBJ, FBX, DAE, 3DS, IGES, STEP, etc. Project files can include 2D images. 2D images are files that visually represent an image in 2D space. 2D images can be stored in formats including, but are not limited to, JPG, JPEG, PNG, TIFF, GIF, BMP, PSD, etc. Project files can include shaders. Shaders may be files written in GLSL or HLSL that represent a vertex or fragment shader. Shaders may contain code that defines the behavior of fragments or vertices. Project files can include audio. Audio can be stored in formats including, but not limited to, MP3, AIFF, AAC, WMA, etc. Project files can include video. Video can be stored in formats including MOV, MPG, MPEG, MP2, M4V, etc.

While the smart asset library may store projects and/or project files, it should be appreciated that client devices 210a-n include storage 213a-n. Storage 213a-n may store local project data. Local project data may include data related to design projects that the user associated with that particular client device 210a-n is currently working on, but has not yet finished and/or uploaded to the design service 218.

The recommendation engine 219 may receive information associated with users of the video service 216 and/or the design service 218. For example, the recommendation engine 219 may retrieve user data 231 from the database 221d. The user data 231 may indicate the preferences and/or behaviors of users of the video service 216 and/or the design service 218. For example, the user data 231 may indicate the preferences and/or behaviors of users associated with client devices 204a-n and/or client devices 210a-n. The users may be users of both the video service 216 and the design service 218. Preferences and/or behaviors of a user may include, for example, personal preferences, content that a user has "liked" via the content application 206, content that a user has uploaded/published to the video service 216 via the content application 206, content that a user has uploaded/published to the design service 218 via the design application 212 and any other user data.

In an embodiment, the recommendation engine 219 may utilize the user data 231 to determine at least one asset in the smart asset library (e.g., database 221c) for a particular user. For example, the recommendation engine 219 may utilize the user data 231 to determine at least one asset in the smart asset library (e.g., database 221c) that a particular user would find of interest based on information about that user. In other embodiments, the recommendation engine 219 may utilize the user data 231 to generate a sample project based on information about a particular user.

For example, a user (e.g., User A) of the design service 218 may use the video service 216 to create videos. User A may have recently started uploading videos of paper drawings to the video service 216. The recommendation engine 219 may utilize user data 310 to determine that User A likes to draw. The recommendation engine 219 may suggest that User A upload/import her drawings into the design service 218 via the design application 212. User A can import her drawings. For example, one of her drawings may depict an elf in a forest with other animals. If User A selects this drawing, a menu on the side of the interface 214 may recommend assets related to forests, elves, and animals. Such assets may be determined by the recommendation engine 219. The recommendation engine 219 may cause output (e.g., display, presentation) of information indicative of these recommended assets on an interface 214 of the design application 212.

User A may select one of the recommended assets. For example, User A may select a tree, and may drop the tree onto the layout of her design project. This user input (e.g., selection of the recommended tree asset) may be fed back into the recommendation engine 219 as additional user data 231. The window depicting the automatically recommended assets may now shows other assets, such as assets that go along with the tree that User A just placed (e.g., rocks, a bunny, etc.) User A may hover over one of these other recommended assets (e.g., the bunny icon) and can pin the asset to the layout of her project. User A can drag onto the layout of her project a rock from the recommended assets. Once she does that, the recommendation engine 219 may suggest additional assets (e.g., some moss). However, any other assets that User A has already pinned (e.g., the bunny) may remain visible on the recommended view. User A can repeat this process until she finishes her project (e.g., building a forest). User A may be able to complete the entire project using recommended resources based on her clicks within the design service 218.

In an embodiment, the recommendation engine 219 may be in communication with a database 221e and may utilize the user data 231 to determine tutorials (e.g., learning material 232) for users. Learning materials 232 may include combinations of file formats that, once put together, allow the user to learn something new, such as a new design technique or skill. Learning materials 232 may include one or more of video, text, and audio. The determined learning material for a particular user may include a tutorial that the user would find of interest or find to be helpful based on information about that user. The recommendation engine 219 may cause output (e.g., display) of information indicative of these recommended learning material 232 on an interface 214 of the design application 212.

For example, a user (e.g., User B) may be new to effect design. User B may never have created an effect before. The user data 231 associated with User B may indicate that User B has no idea how to create any 3D assets or animation. However, the user data 231 associated with User B may indicate that User B is familiar with making logos and 2D graphics for print. The user data 231 associated with User B may indicate that User B enjoys hiking and drawing animals. User B may be a registered user of the video service 216 and may upload both her art and hiking trips to the video service 216. The user data 231 associated with User B may indicate that most of the content that User B uploads to the video service 216 includes her dog, animals she encounters during hikes, and friends.

The recommendation engine 219 may utilize the user data 231 associated with User B to determine some learning materials 232 for User B. For example, the recommendation engine 219 may recommend that User B completes one or more "beginner" tutorials because User B has no idea how to create any 3D assets or animation. In addition to learning materials, the recommendation engine 219 may also recommend sample projects to User B. For example, the recommendation engine 219 may recommend a sample project with only 2D graphics and that involves a dog, because User B likes animals and is familiar with 2D graphics.

In an embodiment, the recommendation engine 219 may utilize the user data 231 to determine other users to recommend to a particular user of the design service 218. The other users may be users of the design service 218 that have complementary expertise in creating effects, as indicated by the user data 231. As another example, the other users may be those users that the particular user is likely to collaborate with on a design project, as indicated by the user data 231. As yet another example, the other users may share at least one similar attribute or at least one association with the particular user, as indicated by the user data 231. The recommendation engine 219 may cause output (e.g., display) of information indicative of these recommended other users on an interface 214 of the design application 212.

For example, a user (e.g., User C) may have expert knowledge of the design service 218. The user data 231 associated with User C may indicate that User C has been publishing a lot of effects and helping a lot of other users of the design service 218. The user data 231 associated with User C may also indicate that User C has published tutorials and other material online for people to learn effect design. In some embodiments, User C may not be a user of the video service 216 or may be an infrequent user of the video service 216. User C may know how to code and work with 3D assets or animation. However, User C may not work with 2D art. User C may be looking for other effect designers to collaborate with. The recommendation engine 219 may determine, based on the user data 231, that User C has been helping other effect designers that need 3D guidance. The recommendation engine 219 may also determine that User C has no 2D knowledge. The recommendation engine can recommend User C to connect with User B (discussed above), who knows 2D and has similar interests. User C can click on User B's profile, notice her expertise, and realize that User B would be a great person to partner with because she knows what he does not know. User C can add User B to his collaboration list.

As another example, User C may then open a new design project. The recommendation engine 219 knows that User C is not interested in learning 2D design because all previous recommendations related to 2D design have been ignored or voted down by User C. As a result, the recommendation engine 219 may learn that users who work with 3D design seem to have an easier time learning scripting. The recommendation engine 219 may recommend to User C some tutorials on how to make a 3D game within the design service 218. For example, the recommendation engine 219 may recommend to User C a tutorial that involves a bear going through a forest. It may also indicate that User B, User C's newly added friend, is also working on this tutorial.

User B may have been working on the absolute beginner's tutorial but may not have yet completed the tutorial. Upon her return, she may see via the interface 214 of the design service 212 that a friend of hers on the video service 216 has recently downloaded the design service 218. User B may be prompted to add this friend on the design service 218 as well. Additionally, User B may be prompted to add a user of the design service 218 that User B does not know. This other user may share her interest in animals and hiking and may be an advanced user of the design service 218. His name is User C, and his profile says, "Ask me anything, I'll help." User B decides to add User C, and says "Hey, I'm new! Nice to meet you!" User C may reply, for example, to let User B know that User C can help mentor User B if needed. User C may feel that the material and people that the design service 218 provides allow her to get inspired faster and lose less time figuring things out independently.

The recommendation engine 219 may be implemented in one or more computing devices. Such a computing device may comprise one or more processors and memory storing instructions that, when executed by the one or more processors, cause the computing device to perform one or more of the various methods or techniques described here. The memory may comprise volatile memory (e.g., random access memory (RAM)) and/or non-volatile memory (e.g., a hard or solid-state drive). The memory may comprise a non-transitory computer-readable medium. The computing device may comprise one or more input devices, such as a mouse, a keyboard, or a touch interface. The computing device may comprise one or more output devices, such as a monitor or other video display. The computing device may comprise an audio input and/or output. The computing device may comprise one or more network communication interfaces, such as a wireless transceiver (e.g., Wi-Fi or cellular) or wired network interface (e.g., ethernet). The one or more network communication interfaces may be configured to connect to the network 232.

The plurality of computing nodes 220 may process tasks associated with the design service 218 and/or the video service 216. The plurality of computing nodes 220 may be implemented as one or more computing devices, one or more processors, one or more virtual computing instances, a combination thereof, and/or the like. The plurality of computing nodes 220 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

Figure 3:
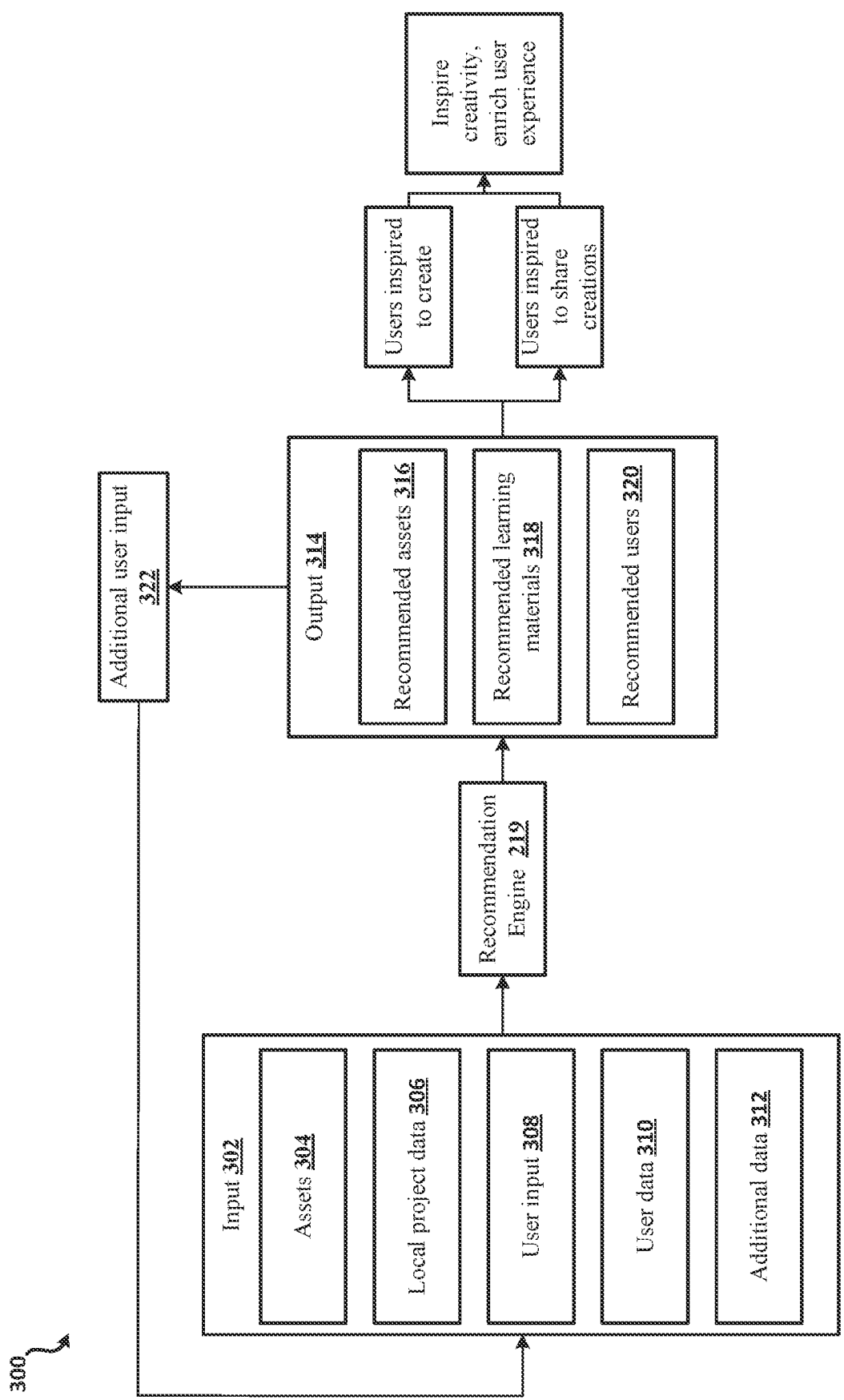
FIG. 3 shows an example flow chart depicting a technique for creating assets using a smart asset library, in accordance with the present disclosure.

FIG. 3 shows an example flow chart 300 depicting a technique for creating assets using a smart assert library. Various items may be input into the recommendation engine. For example, the input 302 may include assets 304. The assets 304 may be the assets 230 stored in the asset library 221c. In some embodiments, the input 302 may include metadata on what each asset represents (e.g., type, color, size, etc.). The input 302 may include local project data 306, such as the local project data in the local storage 213a-n. The local project data 306 may include content included within the active user project (assets currently in-use, which features are in use, etc.). The input 302 may include user input 308. The user input 308 can be, for example, a text query, a voice-command query, and/or a search filter. The query may be a query for a desired asset. The input 302 may include user data 310. The user data 310 may be, for example, the user data 231 stored in the database 221d. The input 302 may additionally include any other data 312 that may be utilized by the recommendation engine 219 to make recommendations to users of the design service 218.

In an embodiment, the recommendation engine 219 receives some or all of the input 302 and, in response, produces output 314. The output 314 can include recommended assets 316. The recommended assets 316 may include assets selected for a particular user from the smart asset library based on the user data 310 associated with that user. The output 314 can include recommended learning materials 318. The recommended learning materials 318 can include learning material 232 selected for a particular user based on the user data 310 associated with that user. The output 314 can include recommended users 320. The recommended users 320 can include other users of the design service 218 selected for a particular user based on the user data 310 associated with that user and associated with the other users. As discussed above, the recommended users 320 may include those other users that a user share interests with and/or is likely to collaborate on design projects with. For example, the recommended users 320 can include users who can help a particular user with his or her project, users that have done projects similar to a particular user, and/or users that have similar interests. The output 314 may inspire users of the design service 218 to create and/or to share creations with other users. As a result, creativity is inspired and the user experience of the design service 218 is enriched.

Figure 4:
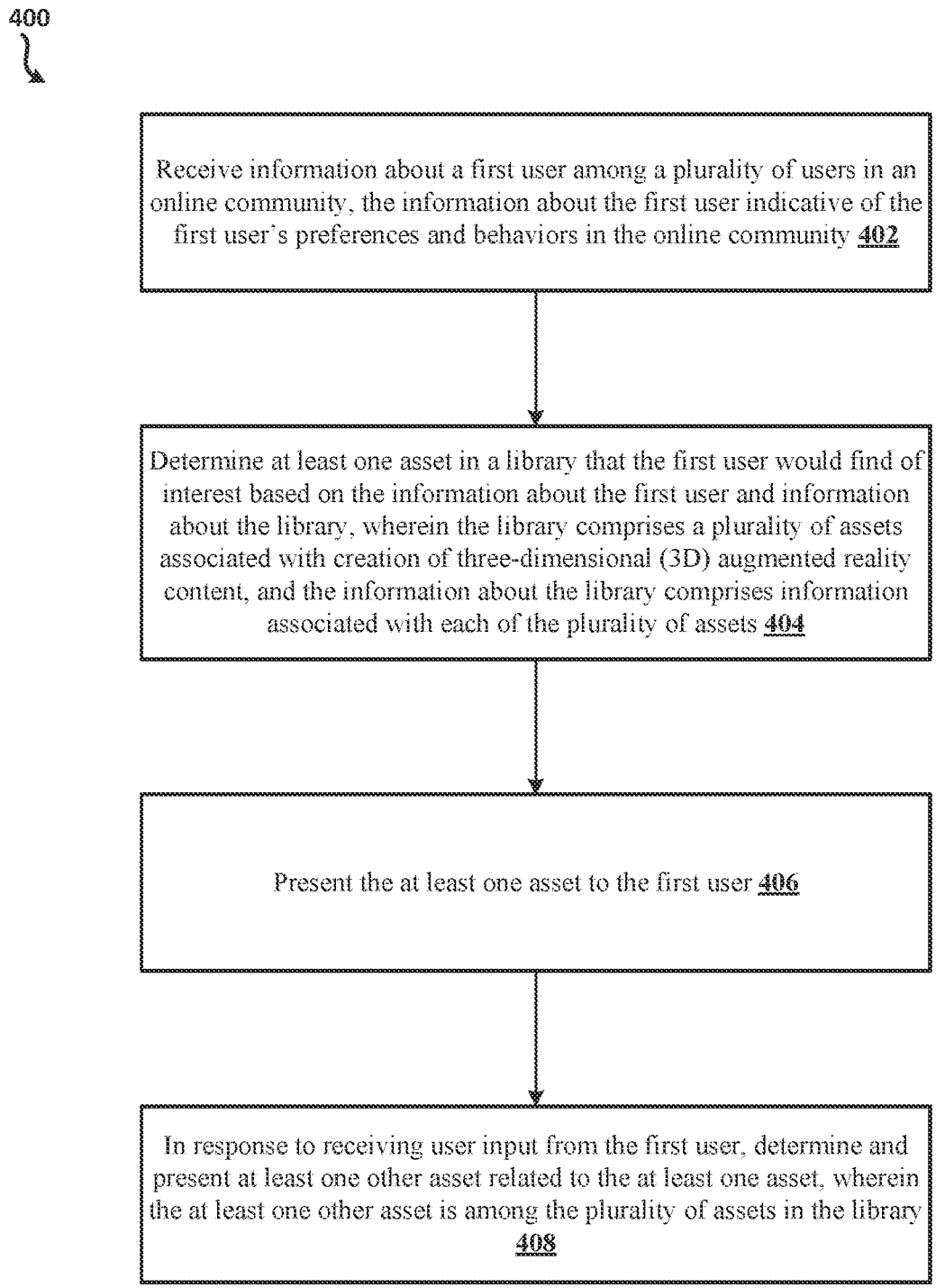
FIG. 4 shows an example method for creating effects using a smart asset library, in accordance with the present disclosure.

FIG. 4 illustrates an example process 400. The design service 218 and/or the design application 212 may perform the process 400 to facilitate the creation of an effect using a smart asset library. In some embodiments, the design service 218 performs a portion of the process 400, and the design application 212 performs other portions of the process 400. Although depicted as a sequence of operations in FIG. 4, those of ordinary skill in the art will appreciate that various embodiments may add, remove, reorder, or modify the depicted operations.

As discussed above, the recommendation engine 219 may receive information associated with users of the video service 216. For example, the recommendation engine 219 may retrieve user data 231 from the database 221d. At 402, information about a first user among a plurality of users in an online community (e.g., community of registered users of the video service 216) may be received. The information about the first user may be indicative of the first user's preferences and behaviors in the online community. The first user may be a user of both the video service 216 and the design service 218. Preferences and/or behaviors of the first user may include, for example, personal preferences, content that the first user has "liked" via the content application 206, content that the first user has uploaded/published to the video service 216 via the content application 206, and any other user data.

The information about the first user may be utilized to determine at least one asset in the smart asset library (e.g., database 221c) for the first user. At 404, at least one asset in a library may be determined. The at least one asset may be an asset that the first user would find of interest based on the information about the first user and information about the library. As described above, the smart asset library (e.g., database 221c) comprises a plurality of assets associated with creation of three-dimensional (3D) AR content. The information about the library comprises information, such as metadata, associated with each of the plurality of assets. The metadata may include metadata indicative of what each asset represents (e.g., type, color, size, etc.). For example, the information about the first user may be utilized to determine at least one asset in the smart asset library that the first user would find of interest.

The recommendation engine 219 may cause output (e.g., display, presentation) of information indicative of these recommended assets on an interface 214 of the design application 212. At 406, the at least one asset may be presented to the first user. The first user may select one of the recommended assets. For example, the first user may select a tree, and may drop the tree onto the layout of her design project. This user input (e.g., selection of the recommended tree asset) may be fed back into the recommendation engine as additional information about the first user. At 408, at least one other asset related to the at least one asset, such as the tree, may be determined and presented in response to receiving user input from the first user. The user input may be user selection of the at least one asset, such as user selection of the tree. The at least one other asset is also among the plurality of assets in the library. The recommendation engine 219 may cause output (e.g., display, presentation) of information indicative of these additional recommended assets on an interface 214 of the design application 212.

FIG. 5 illustrates an example process 500. The design service 218 and/or the design application 212 may perform the process 500 to facilitate the creation of an effect using a smart asset library. In some embodiments, the design service 218 performs a portion of the process 500, and the design application 212 performs other portions of the process 500. Although depicted as a sequence of operations in FIG. 5, those of ordinary skill in the art will appreciate that various embodiments may add, remove, reorder, or modify the depicted operations.

As discussed above, the recommendation engine 219 may receive information associated with users of the video service 216 and/or the design service 218. For example, the recommendation engine 219 may retrieve user data 231 from the database 221d. At 502, information about a first user among a plurality of users in an online community (e.g., community of registered users of the video service 216 and/or the design service 218) may be received. The information about the first user may be indicative of the first user's preferences and behaviors in the online community. The first user may be a user of both the video service 216 and the design service 218. Preferences and/or behaviors of the first user may include, for example, personal preferences, content that the first user has "liked" via the content application 206, content that the first user has uploaded/published to the video service 216 via the content application 206, and any other user data.

At 504, the first user may be recommended to import content into a smart asset library (e.g., database 221c). The content may have been created by the first user and published in the online community. As described above, the library may include a plurality of assets associated with creation of 3D AR content. For example, information about the first user may be utilized to determine that the first user likes to draw. It may be recommended or suggested to the first user that the first user upload or import her drawings into the design service 218 via the design application 212. The first user may import her content, such as the drawings.

At 506, a sample project may be generated based on the information about the first user. The sample project comprises at least one element included in the content. For example, a sample project with only 2D graphics and that involves animals in a forest may be generated if the first user likes animals and is familiar with 2D graphics. For example, a drawing that the first user uploaded/imported may be a drawing of animals in a forest. At 508, the sample project may be presented to the first user so that the first user can work on the sample project.

At 510, one or more assets related to the sample project may be determined based on information about the sample project. For example, if the sample project is a 2D graphics project related to animals in a forest, then the determined assets may be related to forests and animals. Such assets may be determined by the recommendation engine 219. The recommendation engine 219 may cause output (e.g., display, presentation) of information indicative of these recommended assets on an interface 214 of the design application 212. At 512, the one or more assets may be recommended to the first user for use in the sample project.

For example, the first user may select one of the recommended assets. For example, the first user may select a tree, and may drop the tree onto the layout of her design project. This user input (e.g., selection of the recommended tree asset) may be fed back into the recommendation engine 219 as additional user data 231. The window depicting the automatically recommended assets may now shows other recommended assets, such as assets that go along with the tree that the first user just placed (e.g., rocks, a bunny, etc.) The first user may hover over one of these other recommended assets (e.g., the bunny icon) and can pin the asset to the layout of her project. The first user can drag onto the layout of her project a rock from the recommended assets. Once she does that, the recommendation engine 219 may suggest additional assets (e.g., some moss). However, any other assets that the first user has already pinned (e.g., the bunny) may remain visible on the recommended view. The first user can repeat this process until she finishes her project (e.g., building a forest). The first user may be able to complete the entire project using recommended resources based on her clicks within the design service 218.

Figure 6:
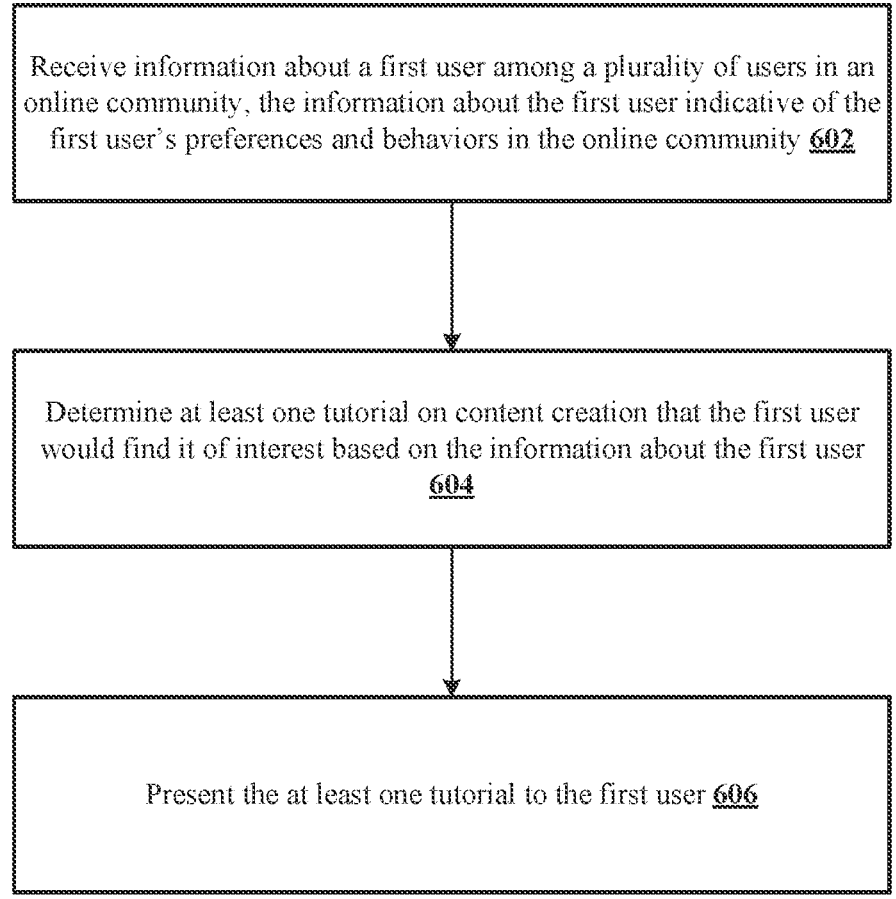
FIG. 6 shows another example method for creating effects using a smart asset library, in accordance with the present disclosure.

FIG. 6 illustrates an example process 600. The design service 218 and/or the design application 212 may perform the process 600 to facilitate the creation of an effect using a smart asset library. In some embodiments, the design service 218 performs a portion of the process 600, and the design application 212 performs other portions of the process 600. Although depicted as a sequence of operations in FIG. 6, those of ordinary skill in the art will appreciate that various embodiments may add, remove, reorder, or modify the depicted operations.

As discussed above, the recommendation engine 219 may receive information associated with users of the video service 216 and/or the design service 218. For example, the recommendation engine 219 may retrieve user data 231 from the database 221d. At 602, information about a first user among a plurality of users in an online community (e.g., community of registered users of the video service 216 and/or the design service 218) may be received. The information about the first user may be indicative of the first user's preferences and behaviors in the online community. The first user may be a user of both the video service 216 and the design service 218. Preferences and/or behaviors of the first user may include, for example, personal preferences, content that the first user has "liked" via the content application 206, content that the first user has uploaded/published to the video service 216 via the content application 206, and any other user data.

The information about the first user may be utilized to determine at least one tutorial (e.g., learning material 232) for the first user. At 604, at least one tutorial on content creation may be determined. The at least one tutorial may include a tutorial that the first user would find of interest or find to be helpful based on the information about the first user.

For example, the first user may be new to effect design. The first user may never have created an effect before. The information about the first user may indicate that the first user no idea how to create any 3D assets or animation. The information about the first user may be utilized to determine some learning materials for the first user that include "beginner" tutorials because the first user has no idea how to create any 3D assets or animation. The recommendation engine 219 may cause output (e.g., display, presentation) of information indicative of the recommended tutorial on an interface 214 of the design application 212. At 606, the at least one tutorial may be presented to the first user. The first user may view the tutorial to improve their ability to design effects via the design service 218.

Figure 7:
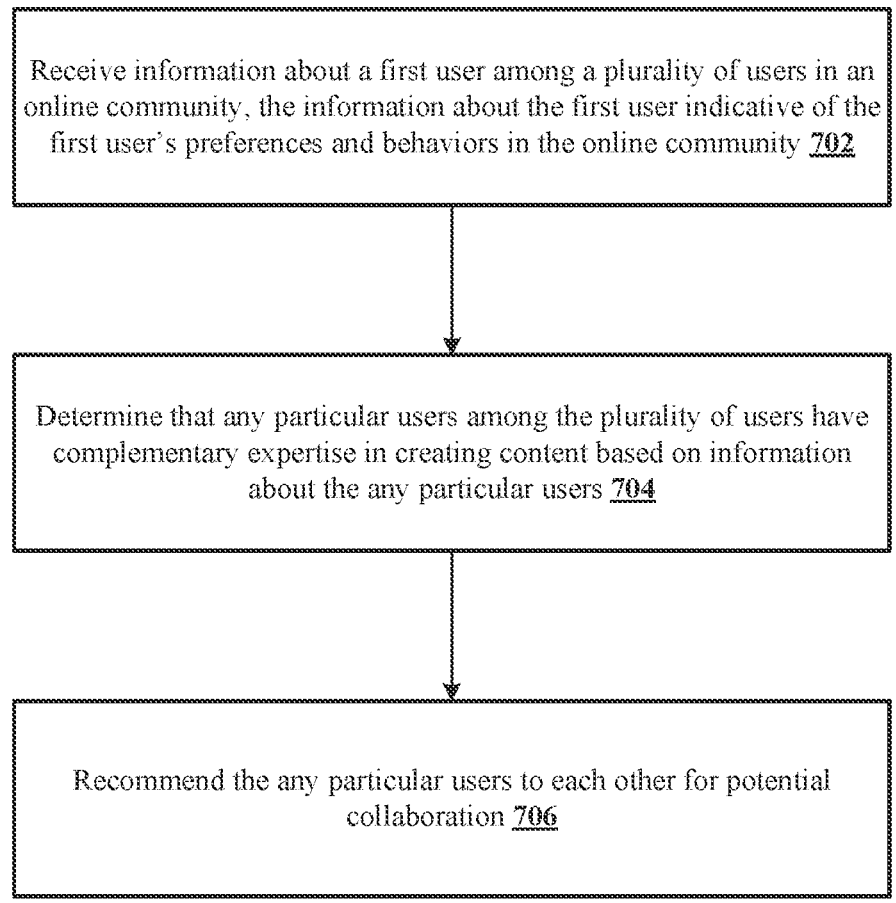
FIG. 7 shows another example method for creating effects using a smart asset library, in accordance with the present disclosure.

FIG. 7 illustrates an example process 700. The design service 218 and/or the design application 212 may perform the process 700 to facilitate the creation of an effect using a smart asset library. In some embodiments, the design service 218 performs a portion of the process 700, and the design application 212 performs other portions of the process 700. Although depicted as a sequence of operations in FIG. 7, those of ordinary skill in the art will appreciate that various embodiments may add, remove, reorder, or modify the depicted operations.

As discussed above, the recommendation engine 219 may receive information associated with users of the video service 216 and/or the design service 218. For example, the recommendation engine 219 may retrieve user data 231 from the database 221d. At 702, information about a first user among a plurality of users in an online community (e.g., community of registered users of the video service 216 and/or the design service 218) may be received. The information about the first user may be indicative of the first user's preferences and behaviors in the online community. The first user may be a user of both the video service 216 and the design service 218. Preferences and/or behaviors of the first user may include, for example, personal preferences, content that the first user has "liked" via the content application 206, content that the first user has uploaded/published to the video service 216 via the content application 206, and any other user data.

The information about the first user may be utilized to determine at least one other user among the plurality of users that have complementary expertise in creating content. At 704, any particular users among the plurality of users that have complementary expertise in creating content may be determined. For example, the first user may be new to effect design. The first user may never have created an effect before. A second user may be experience in effect design. The information about the first user and information about the second user may be utilized to determine that the second user has complementary expertise in creating content to the first user. As another example, the first user may be experienced in 2D design, but not 3D design. A second user may be experienced in 3D design, but not 2D design. The information about the first user and information about the second user may be utilized to determine that the second user has complementary expertise in creating content to the first user. The recommendation engine 219 may cause output (e.g., display, presentation) of information indicative of the particular users on an interface 214 of the design application 212. At 706, the any particular users may be recommended to each other for potential collaboration The first user may view the recommended users and may choose to collaborate with one or more of them.

Figure 8:
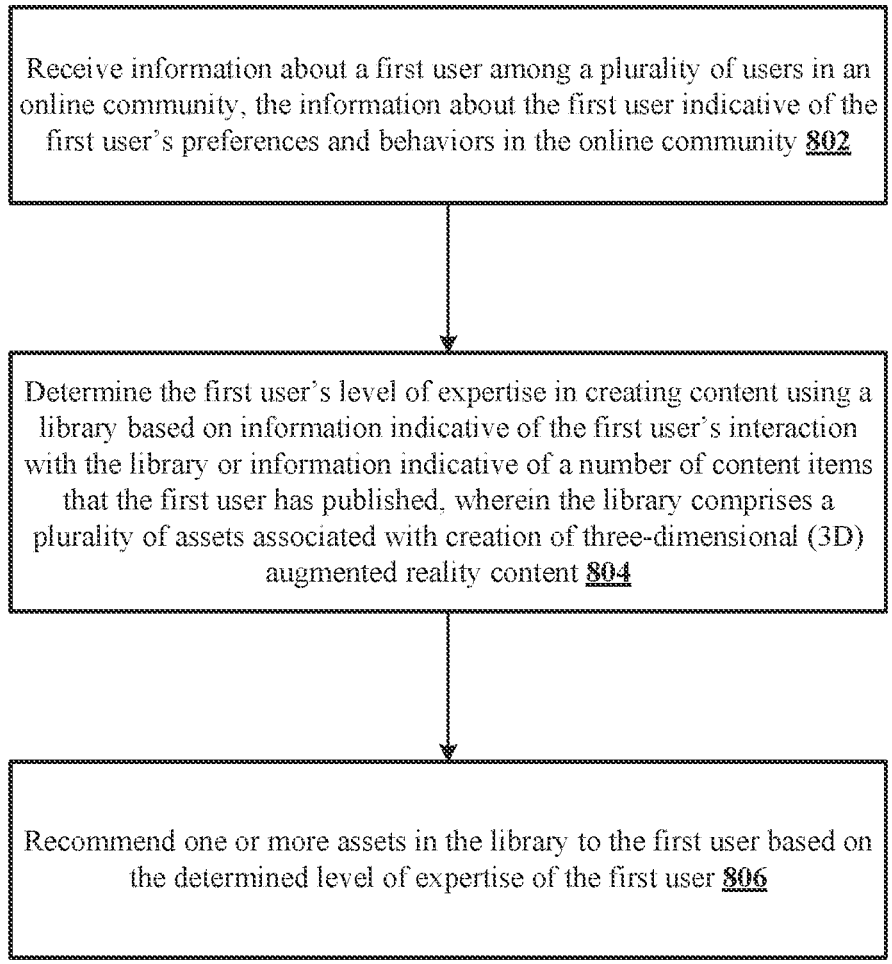
FIG. 8 shows another example method for creating effects using a smart asset library, in accordance with the present disclosure.

FIG. 8 illustrates an example process 800. The design service 218 and/or the design application 212 may perform the process 800 to facilitate the creation of an effect using a smart asset library. In some embodiments, the design service 218 performs a portion of the process 800, and the design application 212 performs other portions of the process 800. Although depicted as a sequence of operations in FIG. 8, those of ordinary skill in the art will appreciate that various embodiments may add, remove, reorder, or modify the depicted operations.

As discussed above, the recommendation engine 219 may receive information associated with users of the video service 216 and/or the design service 218. For example, the recommendation engine 219 may retrieve user data 231 from the database 221d. At 802, information about a first user among a plurality of users in an online community (e.g., community of registered users of the video service 216 and/or the design service 218) may be received. The information about the first user may be indicative of the first user's preferences and behaviors in the online community. The first user may be a user of both the video service 216 and the design service 218. Preferences and/or behaviors of the first user may include, for example, personal preferences, content that the first user has "liked" via the content application 206, content that the first user has uploaded/published to the video service 216 via the content application 206, and any other user data.

At 804, the first user's level of expertise in creating content using a library may be determined based on information indicative of the first user's interaction with the library or information indicative of a number of content items that the first user has published. library comprises a plurality of assets associated with creation of three-dimensional (3D) augmented reality content. For example, it may be determined that the first user is new to effect design. The information associated with the first user may indicate that the first user has no idea how to create any 3D assets or animation. However, the information associated with the first user may indicate that the first user familiar with making logos and 2D graphics for print. Based on this information, it may be determined that the first user's level of experience in creating 3D content is low, but that the first user's level of experience in creating 2D content is high.

At 806, one or more assets in the library may be recommended to the first user based on the determined level of expertise of the first user. For example, a sample project with only 2D graphics may be recommended to the first user, because the first user is familiar with 2D graphics. Conversely, a project with 3D graphics may not be recommended to the first user because the first user is not familiar with 3D graphics. However, a tutorial on 3D graphics may be recommended to the first user instead so that the first user begins gaining experience in 3D graphic design. In other embodiments, a project with 3D graphics may be recommended to a different user that has a high level of experience with 3D graphics.

FIG. 9 illustrates an example process 900. The design service 218 and/or the design application 212 may perform the process 900 to facilitate the creation of an effect using a smart asset library. In some embodiments, the design service 218 performs a portion of the process 900, and the design application 212 performs other portions of the process 900. Although depicted as a sequence of operations in FIG. 9, those of ordinary skill in the art will appreciate that various embodiments may add, remove, reorder, or modify the depicted operations.

As discussed above, the recommendation engine 219 may receive information associated with users of the video service 216 and/or the design service 218. For example, the recommendation engine 219 may retrieve user data 231 from the database 221d. At 902, information about a first user among a plurality of users in an online community (e.g., community of registered users of the video service 216) may be received. The information about the first user may be indicative of the first user's preferences and behaviors in the online community. The first user may be a user of both the video service 216 and the design service 218. Preferences and/or behaviors of the first user may include, for example, personal preferences, content that the first user has "liked" via the content application 206, content that the first user has uploaded/published to the video service 216 via the content application 206, and any other user data.

As discussed above, the recommendation engine 219 may utilize the user data 231 to determine other users to recommend to a particular user of the design service 218. The other users may be users of the design service 218 that have complementary expertise in creating effects, as indicated by the user data 231. As another example, the other users may be those users that the particular user is likely to collaborate with on a design project, as indicated by the user data 231. As yet another example, the other users may share at least one similar attribute or at least one association with the particular user, as indicated by the user data 231. At 904, any particular users among the plurality of users may be recommended to each other based on determining at least one similar attribute or at least one association between the any particular users. The at least one similar attribute or the at least one association is determined based on information about the any particular users. The recommendation engine 219 may cause output (e.g., display) of information indicative of these recommended other users on an interface 214 of the design application 212 so that the particular user can follow or befriend one or more of the recommended other users.

The information about the first user may be utilized to determine at least one asset in the smart asset library (e.g., database 221*c*) for the first user. At 906, at least one asset in a library may be determined. The at least one asset may be an asset that the first user would find of interest based on the information about the first user and information about the library. As described above, the smart asset library (e.g., database 221*c*) comprises a plurality of assets associated with creation of three-dimensional (3D) AR content. The information about the library comprises information, such as metadata, associated with each of the plurality of assets. The metadata may include metadata indicative of what each asset represents (e.g., type, color, size, etc.). For example, the information about the first user may be utilized to determine at least one asset in the smart asset library that the first user would find of interest. The recommendation engine 219 may cause output (e.g., display, presentation) of information indicative of these recommended assets on an interface 214 of the design application 212. At 908, the at least one asset may be presented to the first user. The first user may select one or more of the recommended assets if the first user wants to do so.

The first user may additionally input a search query into the recommendation engine 219. The search query may, for example, include a text query and/or a speech-based voice query. The recommendation engine 219 may utilize the user-input search query in addition to, or as an alternative to, the user data in order to recommend assets to the first user. At 910, one or more assets based on a search query input by the first user may be recommended to the first user. The recommendation engine 219 may cause output (e.g., display, presentation) of information indicative of these recommended assets on an interface 214 of the design application 212. The first user may select one or more of the recommended assets if the first user wants to do so.

Figure 10:
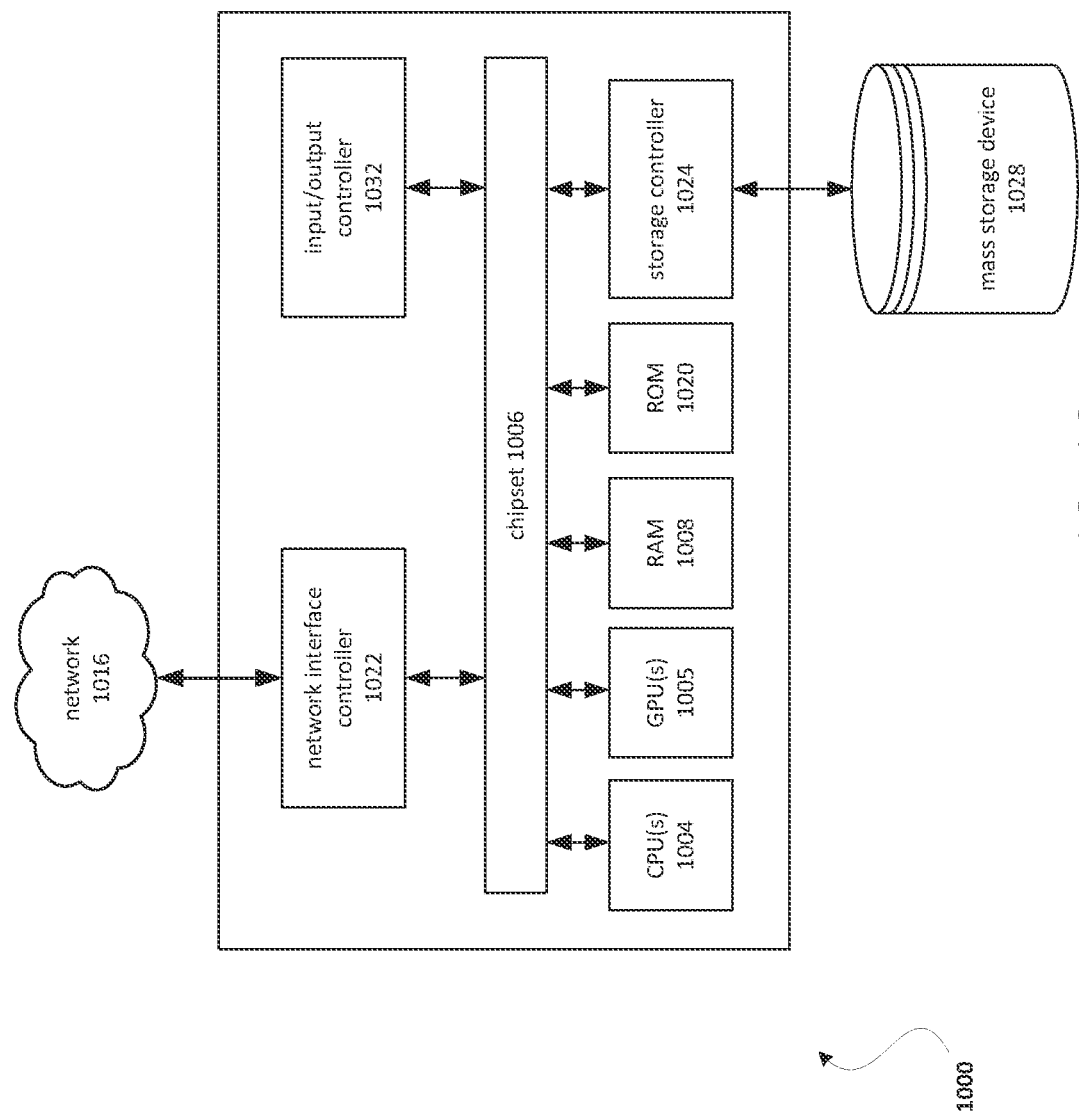
FIG. 10 shows an example computing device which may be used to perform any of the techniques disclosed herein.

FIG. 10 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s). The GPU(s) may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1028 connected to the chipset 1006. The mass storage device 1028 may consist of one or more physical storage units. The mass storage device 1028 may comprise a management component 1010. A storage controller 1028 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1028 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of facilitating effect creation by an improved effect creation tool, comprising:

receiving, from an on-line video service, information about a first user of the on-line video service by an effect creation tool, the effect creation tool configured to create an augmented reality (AR) effect for use to overlay on a video in the on-line video service, wherein the effect creation tool is further configured to recommend, based on the received information, assets for use by the first user to create the AR effect within the effect creation tool, wherein the effect creation tool is further configured to recommend, based on the received information, AR effect learning materials to the first user, wherein the effect creation tool comprises a recommendation engine and communicates with a library, and wherein the information about the first user indicates the first user's preferences and behaviors in the online video service;

determining, by the effect creation tool, at least one asset in the library that the first user would find of interest based on the information about the first user and information accessed by the effect creation tool from the library, wherein the library comprises a plurality of assets associated with creation of three-dimensional (3D) AR content, wherein the information from the library comprises information associated with the at least one asset among the plurality of assets, and wherein the plurality of assets in the library further comprise scripts or plugins configured to be executed within the effect creation tool and to produce visual results;

causing to present the at least one asset to the first user;

in response to receiving user input from the first user based on the at least one asset, determining at least one other asset related to the at least one asset based on the user input, wherein the at least one other asset is among the plurality of assets in the library; and generating the AR effect based on the at least one asset and the at least one other asset.

2. The method of claim 1, further comprising:
generating a sample project based on the information about the first user, wherein the sample project comprises at least one element included in one or more content items uploaded by the first user to the online community; and
presenting the sample project to the first user.

3. The method of claim 1, further comprising:
determining at least one tutorial on content creation that the first user would find of interest based on the information about the first user; and
presenting the at least one tutorial to the first user.

4. The method of claim 1, further comprising:
determining that any particular users among the plurality of users have complementary expertise in creating content based on information about the any particular users; and
recommending the any particular users to each other for potential collaboration.

5. The method of claim 1, further comprising:
recommending any particular users among the plurality of users to each other based on determining at least one similar attribute or at least one association between the any particular users, wherein the at least one similar attribute or the at least one association is determined based on information about the any particular users.

6. The method of claim 1, further comprising:
determining the first user's level of expertise in creating content using the library based on information indicative of the first user's interaction with the library or information indicative of a number of content items that the first user has published; and
recommending one or more assets in the library to the first user based on the determined level of expertise of the first user.

7. The method of claim 1, further comprising:
determining one or more assets related to a project that the first user is working on based on information about the project; and
recommending the one or more assets to the first user for use in the project.

8. The method of claim 1, further comprising:
recommending one or more assets based on a search query input by the first user.

9. The method of claim 1, further comprising:
recommending the first user to import content into the library, wherein the content was created by the first user and published in the online community.

10. The method of claim 1, wherein the plurality of assets in the library comprise one or more scripts or plugins configured to integrate into one or more projects.

11. The method of claim 1, wherein the plurality of assets in the library comprise project files configured to produce effects.

12. The method of claim 1, wherein the plurality of assets in the library comprise 3D models, two-dimensional images, shader files, audio, and videos.

13. A non-transitory computer-readable storage medium, storing computer-readable instructions that upon execution by a processor cause the processor to implement operations, the operation comprising:
receiving, from an on-line video service, information about a first user of the on-line video service by an effect creation tool, the effect creation tool configured to create an augmented reality (AR) effect for use to overlay on a video in the on-line video service, wherein the effect creation tool is further configured to recommend, based on the received information, assets for use by the first user to create the AR effect within the effect creation tool, wherein the effect creation tool is further configured to recommend, based on the received information, learning materials to a first user, wherein the effect creation tool comprises a recommendation engine and communicates with a library, wherein the information comprises information about the first user among a plurality of users in an online community, and wherein the information about the first user indicates the first user's preferences and behaviors in the online video service;

determining, by the effect creation tool, at least one asset in the library that the first user would find of interest based on the information about the first user and information accessed by the effect creation tool from the library, wherein the library comprises a plurality of assets associated with creation of three-dimensional (3D) AR content, wherein the information from the library comprises information associated with the at least one asset among the plurality of assets, and wherein the plurality of assets in the library further comprise one or more scripts or plugins configured to be executed within the effect creation tool and to produce visual results;

causing to present the at least one asset to the first user;

in response to receiving user input from the first user based on the at least one asset, determining at least one other asset related to the at least one asset, wherein the at least one other asset is among the plurality of assets in the library; and generating the AR effect based on the at least one asset and the at least one other asset.

14. The non-transitory computer-readable storage medium of claim 13, the operations further comprising:
generating a sample project based on the information about the first user, wherein the sample project comprises at least one element included in one or more content items uploaded by the first user to the online community; and
presenting the sample project to the first user.

15. The non-transitory computer-readable storage medium of claim 13, the operations further comprising:

determining at least one tutorial on content creation that the first user would find it of interest based on the information about the first user; and presenting the at least one tutorial to the first user.

16. The non-transitory computer-readable storage medium of claim 13, the operations further comprising:

determining that any particular users among the plurality of users have complementary expertise in creating content based on information about the any particular users; and recommending the any particular users to each other for potential collaboration.

17. A computing device, comprising:

at least one processor; and at least one memory comprising computer-readable instructions that upon execution by the at least one processor cause the computing device to perform operations comprising:

receiving, from an on-line video service, information about a first user of the on-line video service by an effect creation tool, the effect creation tool configured to create an augmented reality (AR) effect, wherein the effect creation tool is further configured to recommend, based on the received information, assets for use by the first user to create the AR effect within the effect creation tool, wherein the effect creation tool is further configured to recommend, based on the received information, AR effect learning materials to the first user, wherein the effect creation tool comprises a recommendation engine and communicates with a library, wherein the information comprises information about the first user among a plurality of users in an online community, and wherein the information about the first user indicates the first user's preferences and behaviors in the online video service;

determining, by the effect creation tool, at least one asset in the library that the first user would find of interest based on the information about the first user and information accessed by the effect creation tool from the library, wherein the library comprises a plurality of assets associated with creation of three-dimensional (3D) AR content, wherein the information from the library comprises information associated with the at least one asset among the plurality of assets, and wherein the plurality of assets in the library further comprise one or more scripts or plugins configured to be executed within the effect creation tool and to produce visual results;

causing to present the at least one asset to the first user;

in response to receiving user input from the first user based on the at least one asset, determining at least one other asset related to the at least one asset, wherein the at least one other asset is among the plurality of assets in the library; and generating the AR effect based on the at least one asset and the at least one other asset.

18. The computing device of claim 17, the operations further comprising:

generating a sample project based on the information about the first user, wherein the sample project comprises at least one element included in one or more content items uploaded by the first user to the online community; and presenting the sample project to the first user.

19. The computing device of claim 17, the operations further comprising:

determining at least one tutorial on content creation that the first user would find it of interest based on the information about the first user; and presenting the at least one tutorial to the first user.

20. The computing device of claim 17, the operations further comprising:

determining that any particular users among the plurality of users have complementary expertise in creating content based on information about the any particular users; and recommending the any particular users to each other for potential collaboration.

* * * * *